US008650248B2

(12) United States Patent
Siegel et al.

(10) Patent No.: US 8,650,248 B2
(45) Date of Patent: Feb. 11, 2014

(54) METHODS AND SYSTEMS FOR SELECTING AND IMPLEMENTING DIGITAL PERSONAS ACROSS APPLICATIONS AND SERVICES

(75) Inventors: Steven A. Siegel, Mendham, NJ (US); Steven Brown, Middletown, NJ (US); David Chen, Fremont, CA (US); Mark Foladare, East Brunswick, NJ (US); Paul Gausman, Bridgewater, NJ (US); Reuben Klein, East Brunswick, NJ (US); Gilbert McGrath, Middletown, NJ (US); Karen Mullis, Loganville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 476 days.

(21) Appl. No.: 12/787,287

(22) Filed: May 25, 2010

(65) Prior Publication Data

US 2011/0295928 A1  Dec. 1, 2011

(51) Int. Cl.
*G06F 15/16* (2006.01)
*G06F 3/00* (2006.01)

(52) U.S. Cl.
USPC ............ 709/203; 709/205; 715/751; 726/21; 370/401

(58) Field of Classification Search
USPC .................. 709/204, 203, 205; 370/352, 401; 713/100, 201; 715/706, 758, 745, 751; 455/418; 379/93.02; 726/21
See application file for complete search history.

(56) References Cited

U.S. PATENT DOCUMENTS

| 2003/0131260 | A1* | 7/2003 | Hanson et al. ................ 713/201 |
| 2005/0060532 | A1* | 3/2005 | Dorenbosch et al. ......... 713/100 |
| 2006/0173959 | A1* | 8/2006 | McKelvie et al. ............ 709/204 |
| 2008/0192736 | A1* | 8/2008 | Jabri et al. .................... 370/352 |
| 2009/0002479 | A1* | 1/2009 | Sangberg et al. .......... 348/14.02 |
| 2009/0175426 | A1* | 7/2009 | Beyer et al. ................ 379/93.02 |
| 2010/0169801 | A1* | 7/2010 | Blattner et al. .............. 715/758 |
| 2011/0029889 | A1* | 2/2011 | Karstens ...................... 715/745 |
| 2011/0053574 | A1* | 3/2011 | Rice ............................. 455/418 |
| 2011/0066938 | A1* | 3/2011 | Nageswaram et al. ....... 715/706 |

OTHER PUBLICATIONS

"AT&T's Common Architecture for Real-Time Services Over IP (CARTS)" Based on 3GPP/IMS Standards, Prepared by AT&T Enterprise Architecture AT&T Architecture and Planning, 14 pages, Oct. 1, 2008 AB-1395.

* cited by examiner

*Primary Examiner* — Jungwon Chang
(74) *Attorney, Agent, or Firm* — Myers Bigel Sibley & Sajovec

(57) ABSTRACT

A persona determination approach can be utilized to apply digital personas across multiple communications domains. A service gateway can determine whether to transfer a request for communications services to a Persona Determination Mechanism (PDM). The PDM can select a digital persona based on available information and transmit the digital persona to the service gateway. The service gateway can process the communications services based on the selected digital persona or based on the determination not to transfer the request. In some methods, the service gateway can forward the processed request to one or more network elements for further processing. Related systems are also disclosed.

18 Claims, 5 Drawing Sheets

METHODS AND SYSTEMS FOR SELECTING AND IMPLEMENTING DIGITAL PERSONAS ACROSS APPLICATIONS AND SERVICES

FIELD OF THE INVENTION

The present invention generally relates to the field of electronic communications.

BACKGROUND

Users of some electronic devices can create digital profiles that shape the users' interactions with the electronic devices. For example, a network can provide personalized telephony services to digital profiles, or personas, rather than phone lines or phone numbers.

In some situations, users may want to implement several personas with the same telephonic or multimedia communications device. For example, a user may have separate business and personal personas on a single mobile phone. With a communications architecture that supports personas, use of the separate personas may be billed individually, and the separate personas may treat incoming and outgoing calls differently based on such factors as customer choice or the identity of the caller.

SUMMARY

Embodiments according to the invention can provide methods and systems for applying digital personas across multiple communications domains (e.g., telephony, messaging, web services, and email) by applying a common set of criteria in all domains. A user's digital personas may be defined as the sets of rules used by a network for directing communications requests intended for the user, whether the rules are for telephony, messaging, access to the user's web-based information, email, or other communications methods. The common digital personas may be determined by access to a Persona Determination Mechanism (PDM) used by all of the domains. Each domain may access the PDM to determine an appropriate processing sequence for the requested communications service.

The methods and systems for applying digital personas may include determining, by the use of a processor circuit in a service gateway, whether to transfer a request for communications services from the service gateway to the PDM. In some embodiments, the PDM, using a processor circuit, may select a digital persona based on information available and transmit the selected digital persona to the service gateway. The service gateway may process, using a processor circuit, the communications services based on the selected digital persona if it sent the request to the PDM or based on an asserted digital persona from the original request if it did not.

Other methods and/or systems according to other embodiments will be, or become, apparent to one with skill in the art upon review of the following drawings and detailed description. It is intended that all such additional systems and/or methods be included within this description and be protected by the accompanying claims.

DETAILED DESCRIPTION OF EMBODIMENTS

Figure 1:
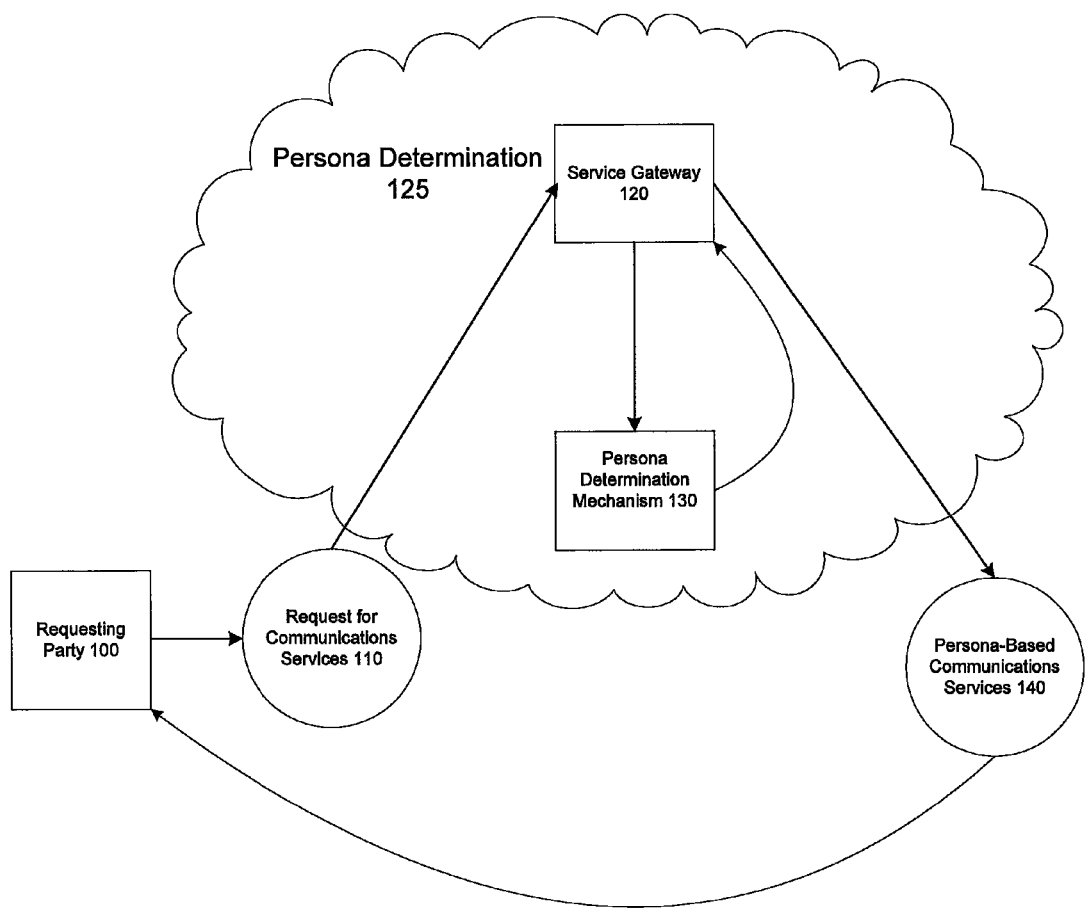
FIG. 1 is a schematic representation of methods and systems of persona determination, including a service gateway that receives requests for communications services, and a Persona Determination Mechanism (PDM) that communicates with the service gateway in some embodiments.

Methods for selecting and implementing digital personas, as well as related systems, will now be described more fully hereinafter with reference to the accompanying drawings, in which illustrative embodiments are shown. However, it will be appreciated that these methods and systems may be embodied in many different forms, and thus the present application should not be construed as limited to the embodiments set forth herein. Rather, these embodiments are provided so that this disclosure will be thorough and complete, and to fully convey the scope of the embodiments to those skilled in the art. Like reference numbers refer to like elements throughout.

The terminology used herein is for the purpose of describing particular embodiments only and is not intended to be limiting of the embodiments. As used herein, the singular forms "a", "an," and "the" are intended to include the plural forms as well, unless the context clearly indicates otherwise. It will be further understood that the terms "comprises," "comprising," "includes," and/or "including," when used herein, specify the presence of stated features, steps, operations, elements, and/or components, but do not preclude the presence or addition of one or more other features, steps, operations, elements, components, and/or groups thereof.

It will be understood that when an element is referred to as being "coupled," "connected," or "responsive" to another element, it can be directly coupled, connected, or responsive to the other element, or intervening elements may also be present. In contrast, when an element is referred to as being "directly coupled", "directly connected," or "directly responsive" to another element, there are no intervening elements present. As used herein the term "and/or" includes any and all combinations of one or more of the associated listed items.

It will be understood that, although the terms first, second, etc. may be used herein to describe various elements, these elements should not be limited by these terms. These terms are only used to distinguish one element from another. Thus, a first element could be termed a second element without departing from the teachings of the present embodiments.

Unless otherwise defined, all terms (including technical and scientific terms) used herein have the same meaning as commonly understood by one of ordinary skill in the art to which these embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments are also described using flowchart illustrations and block diagrams. It will be understood that each block (of the flowcharts and block diagrams), and combinations of blocks, can be implemented by computer program instructions. These program instructions may be provided to a processor circuit, such as a microprocessor, microcontroller, or other processor, such that the instructions which execute on the processor(s) create means for implementing the functions specified in the block or blocks. The computer program instructions may be executed by the processor circuit(s) to cause a series of operational steps to be performed by the processor circuit(s) to produce a computer implemented process such that the instructions which execute on the processor circuit(s) provide steps for implementing the functions specified in the block or blocks.

Accordingly, the blocks support combinations of means for performing the specified functions, combinations of steps for performing the specified functions, and program instruction means for performing the specified functions. It will also be understood that each block, and combinations of blocks, can be implemented by special purpose hardware-based systems which perform the specified functions or steps, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Computer program code or "code" for carrying out operations in embodiments may be written in a procedural language provided by a database environment, such as PL/SQL in an Oracle database or Transact-SQL in Microsoft or Sybase databases, and/or a programming language such as Java, C++, JavaScript, Visual Basic, Perl, or in various other programming languages. Software embodiments do not depend on implementation with a particular programming language. The code, or portions thereof, may execute entirely on one or more servers, or it may execute partly on a server and partly on a client within a client device or as a proxy server at an intermediate point in a communications network. In the latter scenario, the client device may be connected to a server over a LAN or a WAN (e.g., an intranet), or the connection may be made through the web (e.g., via an Internet Service Provider). It is understood that the present embodiments are not TCP/IP-specific or internet-specific. Exemplary embodiments may be implemented using various protocols over various types of computer networks.

In some embodiments, a Persona Determination Mechanism (PDM) can be utilized to select a digital persona to process communications services delivered by a service gateway to a party requesting the communications services. The PDM and service gateway can thus collaborate to determine a level of accessibility and an overall environment of the communications services delivered to the requesting party. In the context of web services, for example, different digital personas may allocate different resources, including access to information, social networks, and/or multimedia content.

Examples of service gateways include a Serving-Call Session Control Function (S-CSCF), an email gateway, and a network element that changes, by techniques such as late binding, a requested Uniform Resource Locator (URL) in a web request. Communications between the service gateway and the PDM may alter the selection of the digital persona by changing or manipulating an identity associated with the request for communications services. For example, the identity changed/manipulated may be an Internet Protocol Multimedia Subsystem (IMS) Public User Identifier (PUID) or other identifier indicating an originating or terminating party to a communications session such as a telephone call or IMS messaging exchange. Alternatively, the identity changed/manipulated may be an email address, a portion of a URL referring to a name or location of a requested resource, or an identifier understood by an application server.

In some embodiments, the service gateway can bypass the PDM and process the communications services based on a digital persona asserted by the party requesting the communications services. For example, the service gateway can determine whether a digital persona is asserted in a request for communications services and, further, the service gateway can determine whether to transfer the request from the service gateway to the PDM or to process the communications services based on the asserted digital persona.

FIG. 1 is a schematic representation of a persona determination system 125 including a service gateway 120 and a Persona Determination Mechanism (PDM) 130. When a requesting party 100 makes a request for communications services 110, the service gateway 120 of the persona determination system 125 receives the request for communications services 110. The persona determination system 125 determines a digital persona for the communications services and delivers persona-based, processed communications services 140 to the requesting party 100. In some embodiments, the persona determination system 125 determines the digital persona by implementing both the service gateway 120 and the PDM 130. In other embodiments, the persona determination system 125 bypasses the PDM 130 and determines the digital persona at the service gateway 120. It will be further understood that the persona determination system 125 shown in FIG. 1, along with the components therein, can provide the operations illustrated, for example, in FIGS. 2, 3, and 4 herein.

Figure 2:
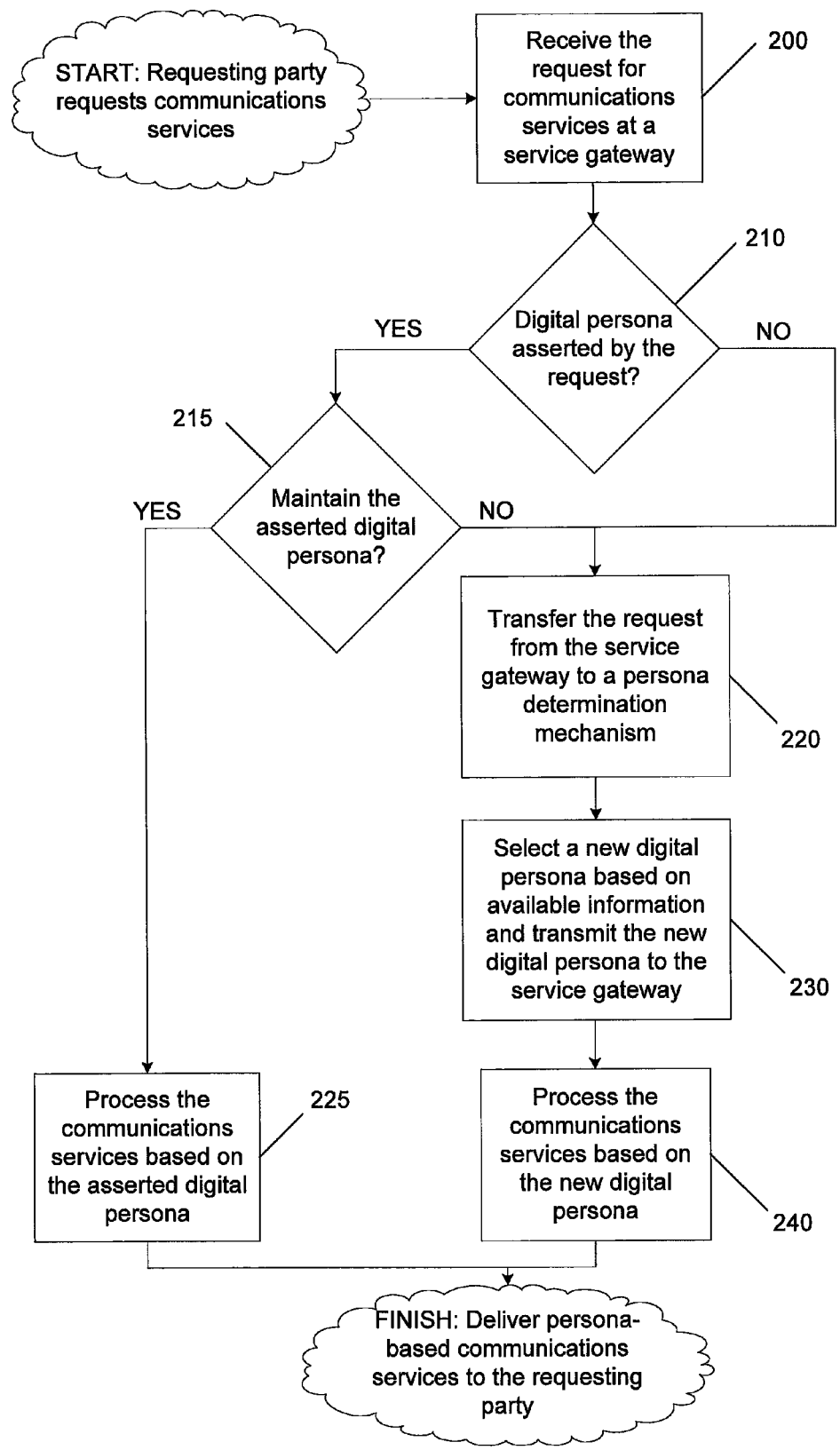
FIG. 2 is a flowchart that illustrates operations of some embodiments of the methods and systems illustrated in FIG. 1.

FIG. 2 is a flowchart illustrating the methods and systems described herein that may use the persona determination system 125 illustrated in FIG. 1. According to FIG. 2, the service gateway 120 receives the request for communications services 110 (Block 200) and determines whether a digital persona is asserted by the request for communications services 110 (Block 210). The service gateway 120 can make this determination based on whether the requesting party 100 submits security information, such as a password, digital key, direct extension, or direct address, with the request for communications services 110. If a digital persona is asserted (Block 210), the service gateway 120 determines whether to maintain the asserted digital persona (Block 215). The service gateway 120 can make this determination by evaluating access information, such as the identity of the requesting party 100, the security information submitted by the requesting party 100, and/or access preferences of the user subscribing to the PDM 130. Access information may be stored within the PDM 130 and/or within a network element such as a network address book, presence server, or location server. If the service gateway 120 decides to maintain the asserted digital persona (Block 215), the service gateway 120 processes the communications services based on the asserted digital persona (Block 225). Because the service gateway 120 can decide to maintain the asserted digital persona instead of transferring the request for communications services 110 to the PDM 130, the persona determination system 125 may apply a digital persona to communications services without implementing the PDM 130. The PDM 130 and/or the service gateway 120 can modify the request for communications services 110, and down-line systems that process the request for communications services 110 after the service gateway 120 may provide different services based on the modifications.

As an alternative to maintaining the asserted digital persona, the persona determination system 125 may apply a new digital persona by implementing both the service gateway 120 and the PDM 130. For example, if a digital persona is not asserted by the request for communications services 110 (Block 210), the service gateway 120 transfers the request for communications services 110 to the PDM 130 (Block 220). The service gateway 120 also transfers the request for communications services 110 to the PDM 130 (Block 220) if a digital persona is asserted (Block 210) but the service gateway 120 decides not to maintain the asserted digital persona (Block 215). For example, the service gateway 120 may decide not to maintain the asserted digital persona based on preferences of the user subscribing to the PDM 130. The service gateway 120 also may decide not to maintain the asserted digital persona based on access information in the request for communications services 110 indicating a restricted relationship between the requesting party 100 and the user subscribing to the PDM 130. Furthermore, the service gateway 120 may decide not to maintain the asserted digital persona based on access information indicating the absence or invalidity of security information in the request for communications services 110. After the service gateway 120 transfers the request to the PDM 130 (Block 220), the PDM 130 selects a new digital persona based on information available to the PDM 130, and transmits the new digital persona to the service gateway 120 (Block 230).

After the PDM 130 selects the new digital persona and transmits the new digital persona to the service gateway 120 (Block 230), the service gateway 120 processes the communications services based on the new digital persona (Block 240). It will be understood that the service gateway 120 may provide web, email, and/or phone services. Phone services may include voice, text, and multimedia services, as well as any other service transmitted via electronic bits for person-to-person communications. The service gateway 120 may communicate with application servers, including web application servers, email servers, and/or IMS application servers. The service gateway 120 provides processed communications services 140 based on a digital persona, and the digital persona may be either the asserted digital persona (Block 225) or the new digital persona (Block 240). The service gateway 120 may also communicate with an application server to render the processed communications services 140 based on the digital persona before the service gateway 120 delivers the processed communications services 140 to the requesting party 100.

The information available to the PDM 130 for determining the new digital persona may include information stored within the PDM 130 and/or information accessed by the PDM 130 but stored elsewhere. For example, the available information may include enabler settings, which may include an address book detailing different categories of contacts of the user subscribing to the PDM 130, including such categories as Employees, Friends, Customers, Family, and Colleagues. A default or specialized persona may also be applied to unclassified contacts, thus instructing the PDM 130 on how to respond to requests for communications services 110 from a new or unrecognized requesting party 100. The user subscribing to the PDM 130 can determine/modify, for example, which category applies to a given contact, and the enabler settings can map each category to a particular persona. Also, changing a contact once in the address book can affect the treatment of that contact by all applications modified by the PDM 130 because the address book may operate across devices, services, and applications using a given communications network. In another example, the user subscribing to the PDM 130 can determine/modify what personal information is available through communications services delivered to contacts associated with a particular persona, such as contacts categorized as Customers, and such a determination/modification may apply to every contact receiving communications services processed by the Customer persona. The user subscribing to the PDM 130 can thus implement unified enabler settings across applications, devices, and services instead of having to maintain and modify multiple contact lists in multiple applications. Accordingly, the user subscribing to the PDM 130 can create separate, persona-based profiles in different applications, such as social networking websites and messaging services, and the PDM 130 can personalize the communications services provided to contacts by selecting a digital persona based on enabler settings applicable across applications, services, and devices. For example, the Family persona may be selected by the unified enabler settings and may include separate email, telephony, messaging, and web page processing or treatments that are customized respective to the individual applications. Different digital personas may thus be associated with different manners of personalizing communications services, such as through demanding different access requirements or sharing different content and application capabilities, and the PDM 130 may use available information, such as the enabler settings, to determine which digital persona to apply to a given communications service.

The enabler settings may further include rules regarding such factors as the time of the day, the day of the week, the present geographic location of the user subscribing to the PDM 130, words typed or spoken by the requesting party 100, and the target application using the communications services. The rules may include preferences of the user subscribing to the PDM 130. In the context of phone services, for example, the PDM 130 may use enabler settings to select a digital persona that may determine that a particular audio clip will be played to the requesting party 100 as a voicemail greeting, that particular menu options will be provided to the requesting party 100, or that the requesting party 100 will be informed or entertained while the user subscribing to the PDM 130 is alerted of the request for communications services 110. As described herein, the enabler settings may select a digital persona based, for example, on the identity of the requesting party 100 making a phone call, the time or date of the call, or the geographic location of the user subscribing to the PDM 130 during the call. The selected digital persona then determines which audio clip to play. The enabler settings may also select a digital persona that affects the routing of phone services, including determining when to route calls to voicemail. It will be understood that phone services include communications services for landline and mobile devices and applications.

The persona determination system 125 will apply the same digital persona category, such as the Friend category, without regard to the particular service gateway 120 or PDM 130 processing the request for communications services 110. For example, the PDM 130 must follow the rules defined in the enabler settings, and the rules are consistent across different communications services. Accordingly, regardless of whether Sally tries to call Harry, send him a text message, send him an email, or access his web page, the persona determination system 125 will consistently categorize the digital persona for her according to the enabler settings.

In some embodiments, in the context of email services, the enabler settings may treat incoming emails differently based on such factors as the content of the email and the identity of the requesting party 100 originating the email. The PDM 130 could thus select a digital persona affecting the treatment of email services provided to the user subscribing to the PDM 130 instead of, or in addition to, selecting a digital persona affecting email services delivered to the requesting party 100, including manual or automated email responses delivered to the requesting party 100. For example, different digital personas may be applied to incoming emails to provide the user subscribing to the PDM 130 with different email display characteristics, organization of email messages, routing of email messages to various inboxes, and/or email alerts.

Figure 3:
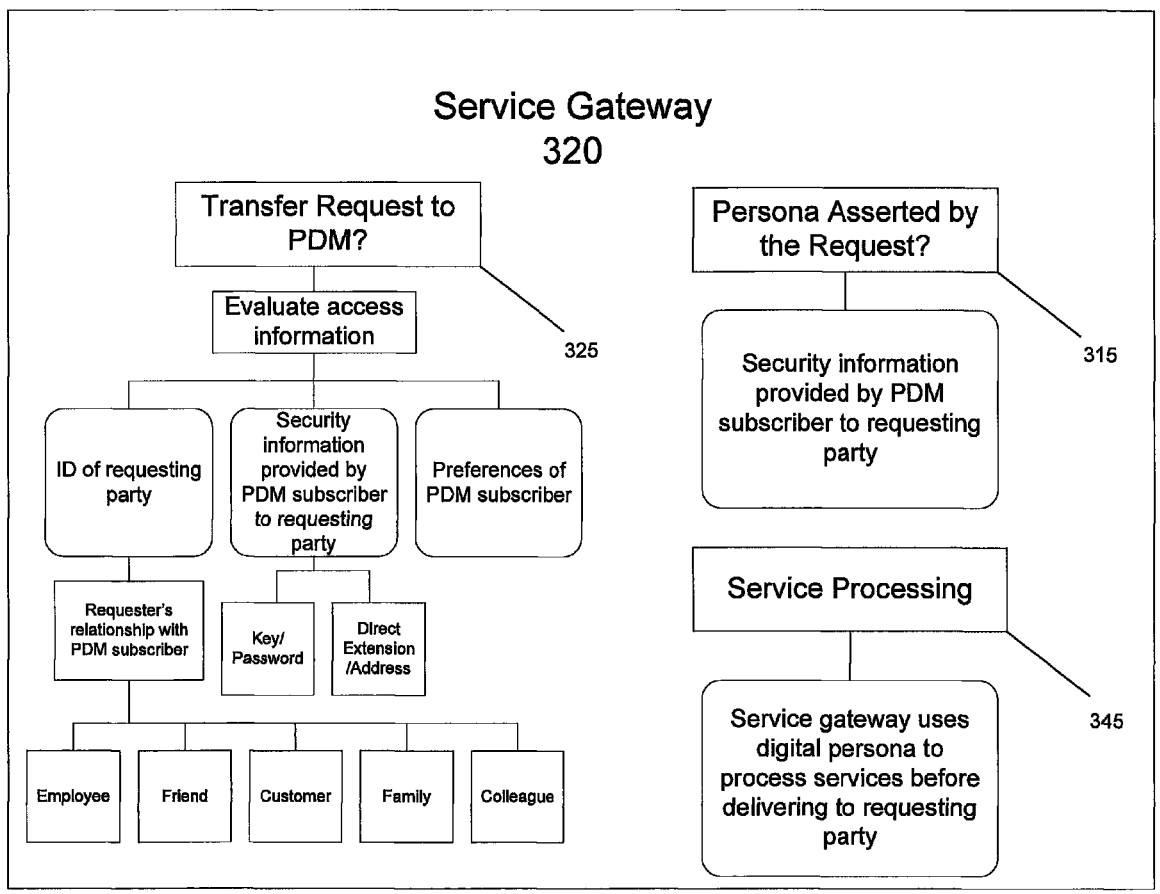
FIG. 3 is a block diagram of operations of a service gateway of some embodiments of the methods and systems illustrated in FIG. 1.

FIG. 3 is a block diagram illustrating various aspects of a service gateway 320 implemented in the methods and systems described herein and illustrated in FIG. 1. For example, the various operations of the service gateway 320 may include determining whether to transfer the request for communications services 110 to the PDM 130 (Block 325). The service gateway 320 may make this determination by evaluating access information such as the identity of the requesting party 100, security information provided to the requesting party 100 by the user subscribing to the PDM 130, and/or access preferences of the user subscribing to the PDM 130. The identity of the requesting party 100 may include information regarding the requesting party's 100 relationship with the user subscribing to the PDM 130. For example, the service gateway 320 may decide to transfer the request for communications services 110 to the PDM 130 when the requesting party 100 is an Employee or a Customer, and decide not to transfer when the requesting party 100 is a Friend, Colleague, or Family.

The service gateway 320 may evaluate security information provided to the requesting party 100 by evaluating security information submitted by the requesting party 100 in the request for communications services 110, including such security information as a password, digital key, direct extension, or direct address. For example, in the context of web services, the user subscribing to the PDM 130 may provide the requesting party 100 with a direct URL that instructs the service gateway 320 to bypass the PDM 130.

In some embodiments, the service gateway 320 may evaluate access information by evaluating access preferences of the user subscribing to the PDM 130. For example, the user may prefer that the service gateway 320 transfer every request for communications services 110 to the PDM 130, regardless of the access information submitted by the requesting party 100. Alternatively, the user subscribing to the PDM 130 may prefer that the service gateway 320 transfer all requests for communications services 110 submitted during a particular time of the day, on a particular day of the week, based on the geographic location of the user subscribing to the PDM 130, or based on the target application using the communications services. Moreover, the user subscribing to the PDM 130 may prefer that the service gateway 320 transfer all requests for communications services 110 from a particular requesting party 100. For example, the user subscribing to the PDM 130 may have previously provided security information to a certain requesting party 100 that the user subscribing to the PDM 130 subsequently prefers not to have direct access.

The service gateway 320 may also determine whether a digital persona is asserted by the request for communications services 110 (Block 315). The service gateway 320 can make this determination based on whether the requesting party 100 submits security information with the request for communications services 110. As described herein, the service gateway 320 may evaluate security information such as a password, digital key, direct extension, or direct address (Block 325).

The service gateway 320 may use a digital persona, whether asserted by the request for communications services 110 or selected by the PDM 130, to process communications services before delivering the communications services to the requesting party 100 (Block 345). The service gateway 320 may provide web, email, and/or phone services. The service gateway 320 may forward the request for communications services 110 to one or more network elements, such as network servers, and may change/modify the request for communications services 110 before forwarding it. For example, the service gateway 320 may communicate with application servers, including web application servers, email servers, and/or IMS application servers. The service gateway 320 may communicate with one or more of the application servers to render the processed communications services 140 based on the digital persona before the service gateway 320 delivers the processed communications services 140 to the requesting party 100. After communicating with the one or more application servers to render the processed communications services 140, the service gateway 320 may also transmit the processed communications services 140 to one or more additional application servers for additional processing before delivery to the requesting party 100.

Figure 4:
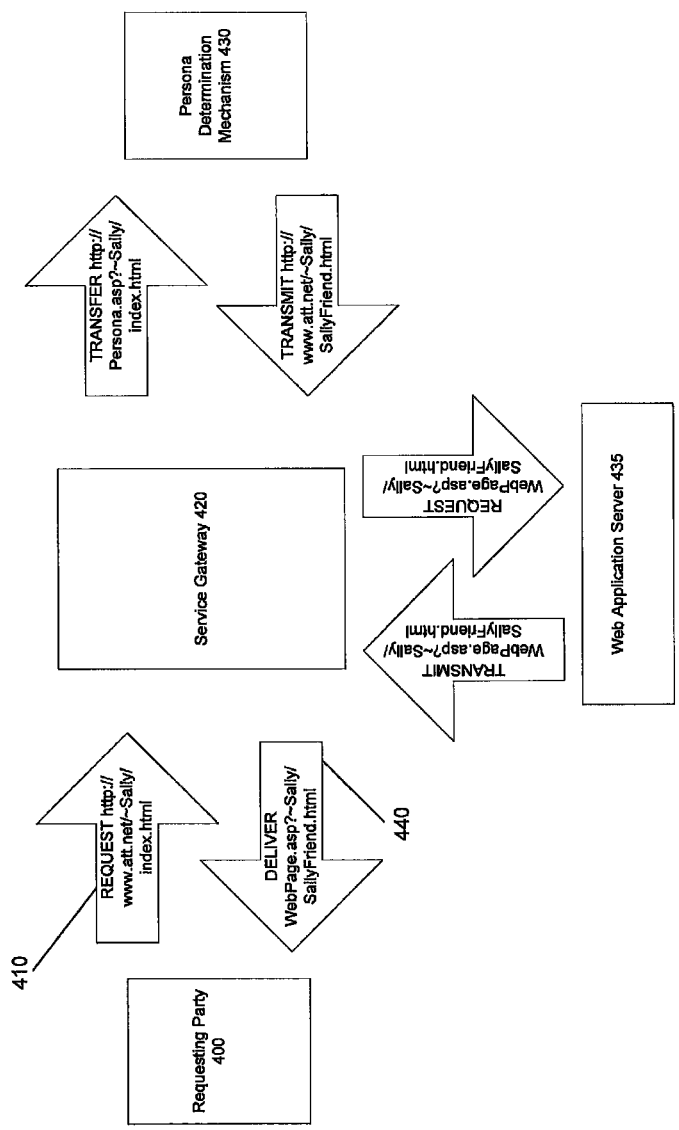
FIG. 4 is a request/response flow diagram that illustrates persona determination operations responsive to a request for web services in some embodiments.

FIG. 4 is a flow diagram illustrating some embodiments of the methods and systems described herein responsive to a request for web services. A requesting party 400 may request 410 a website associated with a user, Sally, subscribing to a Persona Determination Mechanism (PDM) 430. The request 410 may be a URL such as http://www.att.net/~Sally/index.html. A service gateway 420 receives the request 410, and may transfer the request 410 to the PDM 430. The service gateway 420 may modify the URL of the request 410 and transfer the modified URL, such as http://Persona.asp?~Sally/index.html, to the PDM 430. The modified URL may indicate, for example, that the request 410 generally asked for a website associated with Sally. The modified URL may also indicate requests 410 asking for a more specific website associated with Sally, including requests 410 such as http://www.att.net/~Sally/SallyCustomer.html. The PDM 430 may select a digital persona based on information associated with the request 410 and based on enabler settings that may be defined by the user subscribing to the PDM 430. The PDM 430 may then transmit the selected digital persona to the service gateway 420. For example, the PDM 430 may transmit a Friend persona by transmitting a URL such as http://www.att.net/~Sally/SallyFriend.html to the service gateway 420. Alternatively, the PDM 430 may transmit a Friend persona by transmitting a string such as "SallyFriend" that allows the service gateway 420 to formulate a new URL. The service gateway 420 may then process the communications services based on the selected digital persona changing the URL and forward the processed communications services 440 directly or indirectly to a web application server 435, where the resource may be accessed. For example, the service gateway 420 may request website such as WebPage.asp?~Sally/SallyFriend.html 440 from the web application server 435, which transmits the processed communications services 440 back to the service gateway 420 after further processing and before the service gateway delivers the processed communications services 440 to the requesting party 400.

In some embodiments, the service gateway 420 may deliver the processed communications services 440 directly to the requesting party 400 without requesting further processing from the web application server 435. For example, the service gateway 420 may be a web application server, and the service gateway 420 may not require further processing from additional web application servers 435.

In some embodiments, the service gateway 420 may process the request 410 and deliver persona-specific, processed communications services 440 to the requesting party 400 without transferring the request 410 to the PDM 430. In particular, the user subscribing to the PDM 430 may configure the service gateway 420 to bypass the PDM 430 and process the communications services based on a digital persona asserted by the request 410. For example, the service gateway 420 may allow the requesting party 400 to assert the Customer persona by requesting a direct URL such as http://www.att.net/~Sally/SallyCustomer.html.

Figure 5:
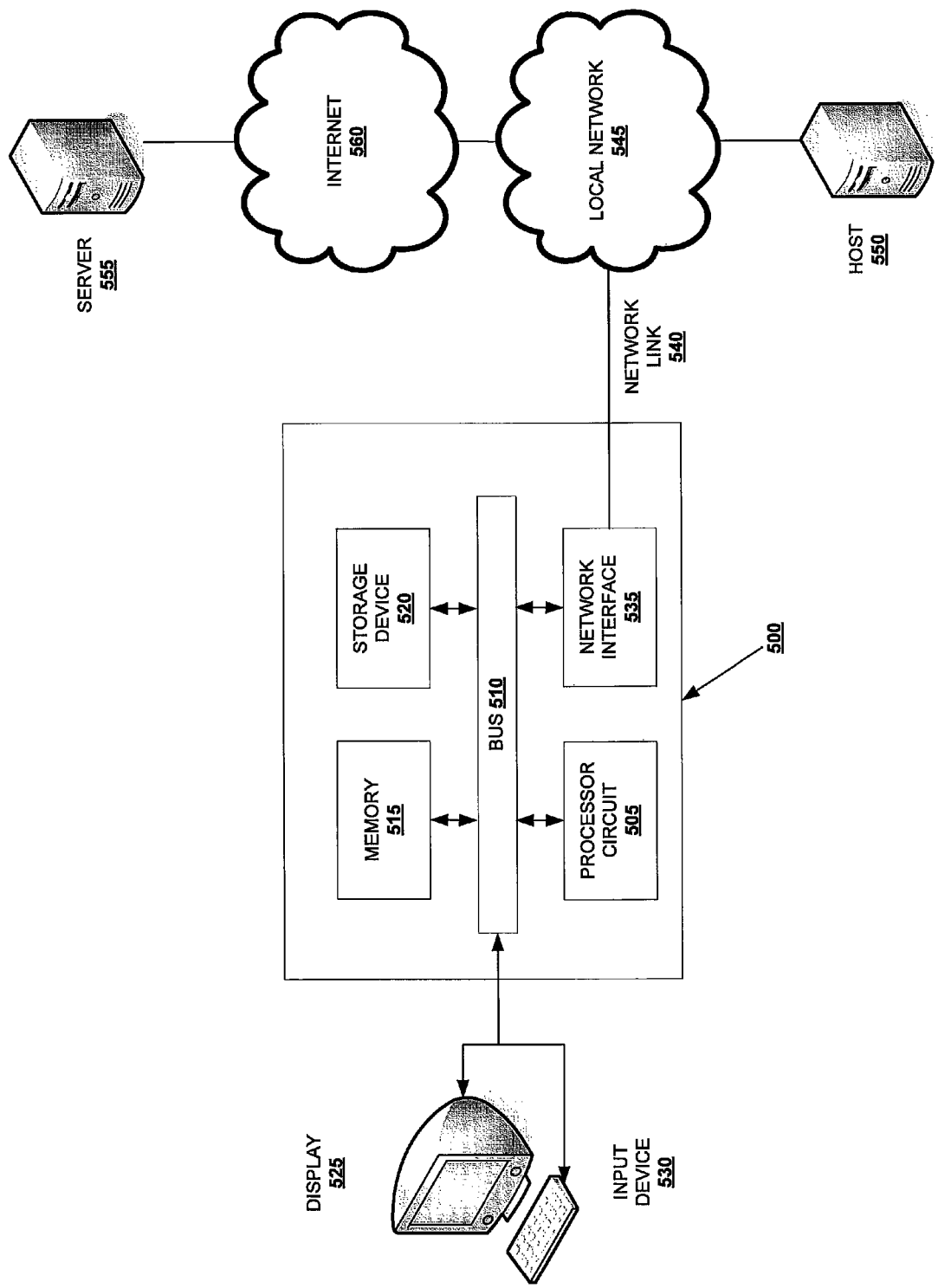
FIG. 5 is a block diagram that illustrates processor circuits configured to operate methods and systems of persona determination in some embodiments.

FIG. 5 is a block diagram that illustrates a computer system 500 on which the methods and systems described herein may be used. Computer system 500 may include a processor circuit 505 for processing commands and information, and which may be communicatively coupled to bus 510. The processor circuit 505 may be embodied, for example, as one or more enterprise, application, personal, pervasive, and/or embedded computer systems and/or special purpose hardware that may be centralized and/or distributed and connected by a wired network and/or a wireless network. Computer system 500 may also include main memory 515 communicatively coupled to bus 510. Main memory 515 may include a random access memory (RAM) or other volatile storage device for storing executing applications or intermediate information during execution of instructions by processor circuit 505, and/or a read-only memory (ROM) or other non-volatile storage device for storing static information and instructions for processor circuit 505. Computer system 500 may further include storage device 520, such as a hard disk drive or other magnetic media device, a compact disc (CD) or digital versatile disc (DVD) drive or other optical media device, or a flash drive or other solid-state device, communicatively coupled to bus 510. Storage device 520 may be used for storing instructions and data for processing by processor circuit 505. Computer system 500 may be communicatively coupled via bus 510 to display 525, such as a liquid-crystal display (LCD) or cathode ray tube (CRT) monitor. Computer system 500 may also be communicatively coupled via bus 510 to input device 530, which may be a device such as a keyboard for entering alphanumeric input, or a mouse, trackball, or touch pad for providing cursor control.

Computer system 500 may also include a network interface 535 communicatively coupled to bus 510. Network interface 535, such as a wired or wireless network interface card (NIC), a modem, or other communications device, may provide a bi-directional data communication coupling via network link 540 to a local network 545. Network link 540 may provide data communication to, e.g., host computer 550 via local network 545, or to server 555 via the Internet 560. In this way, computer system 500 may send and receive messages and data, including program code, through network interface 535 and network link 540.

According to some embodiments of the invention, the methods described herein are performed by computer system 500 in response to processor circuit 505 executing one or more sequences of one or more instructions contained in main memory 515. Such instructions may be read into main memory 515 from another computer-readable medium, such as storage device 520. Execution of the sequences of instructions contained in main memory 515 causes processor circuit 505 to perform the steps described herein. For example, the user subscribing to the PDM 130 may use the input device 530 to define and/or modify enabler settings, which may be stored in main memory 515. Accordingly, in embodiments where service gateway 120 transfers requests for communications services 110 to the PDM 130, PDM 130 may select a digital persona based on enabler settings that processor circuit 505 accesses from main memory 515. In another example, service gateway 120 may use processor circuit 505 to process access information, such as preferences of the user subscribing to the PDM 130 that are stored in main memory 515, and thereby determine whether to transfer the request for communications services 110 to the PDM 130. In a further example, service gateway 120 may use computer system 500 and processor circuit 505 to communicate with server 555, such as one or more of the application servers, to authenticate and/or authorize requests for communications services 110, and/or to process the communications services.

In alternative embodiments, hardware circuitry may be used in place of or in combination with software instructions to implement the invention. Thus, embodiments of the invention are not limited to any specific combination of hardware circuitry and software. Moreover, it will be appreciated by one of skill in the art that embodiments of the invention may be implemented on a single computer system 500, or may be implemented on, e.g., a high-availability cluster of two or more computer systems, each substantially similar to computer system 500.

The present invention is related to the use of persona determination system 125 for implementing the methods and systems described herein. The persona determination system 125 is responsive to requests for communications services 110 from requesting party 100. The persona determination system 125 may include service gateway 120, PDM 130, and application servers. Service gateway 120 may operate with application servers to authenticate and/or authorize requests for communications services 110. Service gateway 120 may also operate with application servers to apply a digital persona to communications services to process the communications services. Finally, service gateway 120 processes and/or routes processed communications services 140 to the requesting party 100. In some embodiments, service gateway 120 may transfer the request for communications services 110 to PDM 130, which selects a new digital persona based on available information, such as enabler settings. Embodiments of the invention may apply digital personas across multiple communications domains, including such communications services as web, email, and phone services, and various devices and applications capable of accessing communications services. Thus, embodiments of the invention are not limited to any specific combination of communications services, applications, and devices.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed various embodiments and, although specific terms are employed, they are used in a generic and descriptive sense only and not for purposes of limitation.

What is claimed is:

1. A method of applying digital personas across multiple communications domains, comprising:
   performing operations as follows using a processor:
   receiving a request for communications services from a user device at a service gateway;

determining at the service gateway whether an original digital persona for the communication services is asserted by the request;

determining whether to transfer the request from the service gateway to a persona determination mechanism, wherein the persona determination mechanism selects a new digital persona and transmits the new digital persona to the service gateway; and processing the communications services based on one of the new digital persona and the original digital persona;

wherein the request for communications services further comprises security information provided by a requesting party making the request; and wherein the persona determination mechanism selects the new digital persona based on the security information.

2. The method according to claim 1, wherein the new digital persona is applicable to web, email, and phone services.

3. The method according to claim 1, wherein the service gateway provides the communications services comprising web, email, and phone services.

4. The method according to claim 1, wherein the service gateway comprises a Serving-Call Session Control Function, a late-binding-capable web server, an email gateway, and a web application server.

5. The method according to claim 1, wherein processing the communications services comprises forwarding the request from the service gateway to a network element.

6. The method according to claim 5, wherein the network element comprises an application server.

7. The method according to claim 1, wherein determining whether to transfer the request from the service gateway to the persona determination mechanism further comprises evaluating access information included in the request.

8. The method according to claim 7, wherein the access information further comprises identity information corresponding to an identity of a requesting party making the request.

9. The method according to claim 1, wherein the available information comprises preferences of a subscriber of the persona determination mechanism and identity information corresponding to a requesting party, and wherein the preferences associate the requesting party with the new digital persona.

10. A system of applying digital personas across multiple communications domains, comprising:

a processor; and a computer readable medium that comprises computer readable program code that when executed by the processor causes the processor to perform operations comprising:

receiving a request for communications services from a user device at a service gateway;

determining at the service gateway whether an original digital persona for the communication services is asserted by the request;

determining whether to transfer the request from the service gateway to a persona determination mechanism, wherein the persona determination mechanism selects a new digital persona and transmits the new digital persona to the service gateway; and processing the communications services based on one of the new digital persona Of and the original digital persona;

wherein the request for communications services further comprises security information provided by a requesting party making the request; and wherein the persona determination mechanism selects the new digital persona based on the security information.

11. The system according to claim 10, wherein the new digital persona is applicable to web, email, and phone services.

12. The system according to claim 10, wherein the service gateway is to provide the communications services comprising web, email, and phone services.

13. The system according to claim 10, wherein the service gateway comprises a Serving-Call Session Control Function, a late-binding-capable web server, an email gateway, and a web application server.

14. The system according to claim 10, wherein processing the communications services comprises forwarding the request from the service gateway to a network element.

15. The system according to claim 14, wherein the network element comprises an application server.

16. The system according to claim 10, wherein determining whether to transfer the request from the service gateway to the persona determination mechanism further comprises evaluating access information included in the request.

17. The system according to claim 16, wherein the access information further comprises identity information corresponding to an identity of a requesting party making the request.

18. The system according to claim 10, wherein the available information comprises preferences of a subscriber of the persona determination mechanism and identity information corresponding to a requesting party, and wherein the preferences associate the requesting party with the new digital persona.

* * * * *

UNITED STATES PATENT AND TRADEMARK OFFICE
CERTIFICATE OF CORRECTION

PATENT NO. : 8,650,248 B2  Page 1 of 1
APPLICATION NO. : 12/787287
DATED : February 11, 2014
INVENTOR(S) : Siegel et al.

It is certified that error appears in the above-identified patent and that said Letters Patent is hereby corrected as shown below:

<u>In the Claims:</u>
Column 12, Claim 10, Line 12: Please correct "digital persona Of and the original"
to read -- digital persona and the original --

Signed and Sealed this
Twelfth Day of August, 2014

Michelle K. Lee
*Deputy Director of the United States Patent and Trademark Office*